United States Patent
Yagi et al.

(10) Patent No.: US 7,654,094 B2
(45) Date of Patent: Feb. 2, 2010

(54) RADIAL TURBINE AND METHOD OF COOLING NOZZLE OF THE SAME

(75) Inventors: Manabu Yagi, Tsuchiura (JP);
Kuniyoshi Tsubouchi, Mito (JP);
Tadaharu Kishibe, Hitachinaka (JP);
Susumu Nakano, Hitachi (JP); Satoshi Dodo, Kasama (JP)

(73) Assignee: Hitachi, Ltd., Tokyo (JP)

( * ) Notice: Subject to any disclaimer, the term of this patent is extended or adjusted under 35 U.S.C. 154(b) by 312 days.

(21) Appl. No.: 10/589,976

(22) PCT Filed: Mar. 9, 2004

(86) PCT No.: PCT/JP2004/003003

§ 371 (c)(1),
(2), (4) Date: Aug. 18, 2006

(87) PCT Pub. No.: WO2005/085615

PCT Pub. Date: Sep. 15, 2005

(65) Prior Publication Data

US 2008/0092515 A1    Apr. 24, 2008

(51) Int. Cl.
*F02C 6/08* (2006.01)
(52) U.S. Cl. .................... 60/782; 60/785; 415/115
(58) Field of Classification Search .................... 60/782, 60/785, 806; 415/115, 208.3, 208.4
See application file for complete search history.

(56) References Cited

U.S. PATENT DOCUMENTS

| 4,825,640 A | * | 5/1989 | Shekleton | ............ 60/804 |
| 5,174,108 A | * | 12/1992 | Shekleton | ............ 60/804 |
| 5,280,703 A | * | 1/1994 | Corrado et al. | ............ 60/804 |
| 2003/0031555 A1 | * | 2/2003 | Noe et al. | ............ 415/115 |

FOREIGN PATENT DOCUMENTS

| JP | 62-135802 | 8/1987 |
| JP | 2-503110 | 9/1990 |
| JP | 7-180838 | 7/1995 |

* cited by examiner

*Primary Examiner*—Michael Cuff
*Assistant Examiner*—Phutthiwat Wongwian
(74) *Attorney, Agent, or Firm*—Mattingly & Malur, P.C.

(57) ABSTRACT

A turbine nozzle (2) that, among components constructing a turbine, reaches particularly high temperature is efficiently cooled with a relatively simple structure. A double casing structure in which a turbine casing (7) is provided outside a turbine shell (5) is formed. The turbine casing (7) functions as a flow path (24) for compressed air (20→21) before combustion. The turbine shell (5) covers a turbine nozzle (2) and a radial turbine impeller (3) and forms flow paths (15, 16) for combustion gas (10→11→12→13). The compressed air (21) before combustion flowing in the flow path (24), for compressed air, having air-tightness between itself and the outside air is blown to the turbine nozzle (2) through a through-hole (51) penetrating both wall surfaces of the turbine shell (5) so that the turbine nozzle (2) is evenly cooled and the compressed air used to cool the turbine nozzle is made to flow toward the turbine impeller (3).

10 Claims, 4 Drawing Sheets

(A) FRONT SECTIONAL VIEW (B) SIDE SECTIONAL VIEW (A)

(B) ENLARGED SECTIONAL VIEW TAKEN ALONG B-B (A)

(B) ENLARGED SECTIONAL VIEW TAKEN ALONG B-B

20 # RADIAL TURBINE AND METHOD OF COOLING NOZZLE OF THE SAME

TECHNICAL FIELD

The present invention relates to a radial turbine improved in cooling structure, and a method of cooling a turbine nozzle thereof.

BACKGROUND ART

In recent years, a gas turbine power generating equipment generating several tens to several hundreds kW and using a radial turbine as a gas turbine for driving a generator is under consideration. As a means for enhancing power generation efficiency in such a gas turbine power generating equipment, it is cited to increase turbine inlet temperature. However, if the turbine inlet temperature is increased, particularly a turbine nozzle and the like reach a high temperature, which may cause a situation where those materials or the like are melted. As one countermeasure against it, there is a method of reducing the metal temperature by cooling the turbine nozzle using air at lower temperature/higher pressure than the gas in a turbine inlet portion. An example of the structure to which such a cooling method is applied is disclosed in JP-U-62-135802. In this prior art, the cooling air which cools the nozzle of the radial turbine diverges, so that one of the airs is released outside after passing through the inside of a nozzle blade, and the other of the airs is sprayed to the nozzle from an upstream side of a combustion gas flow path to cool the nozzle.

DISCLOSURE OF THE INVENTION

In the above described prior art, one of the cooling airs which cools the nozzle of the radial turbine is released outside after passing through the inside of the nozzle blade, and thus causes waste of supply energy correspondingly to reduce the efficiency.

Further, although the flow path of the cooling air is complicated, a cooling hole toward the nozzle can not be provided anywhere but at one side of a flow path wall surface, which may cause imbalance of the temperature distribution of the nozzle and thus generate thermal distortion.

An object of the present invention is to provide a radial turbine power generating equipment which realizes any of the followings. First, it is to enhance the turbine efficiency by using air which cools a turbine nozzle blade. Next, it is to cool a turbine nozzle uniformly to prevent occurrence of thermal distortion thereof. Further, it is to provide simple structure which efficiently cools the turbine nozzle.

A preferred embodiment of the present invention is configured so that substantially all cooling air which cools a turbine nozzle of a radial turbine flows into a turbine gas flow path.

A more preferable embodiment of the present invention includes an air flow path formed substantially in an airtight state between outside air outside a combustion gas flow path communicating from a combustor to a turbine shell, an air take-in hole which takes air into this air flow path from the outside, a blow-off hole which introduces a part of the air taken into the air flow path into the combustor, and a shell through-hole which injects the other part of the air taken into the air flow path to a vicinity of the nozzle in the combustion gas flow path.

In these preferable embodiments of the present invention, the turbine nozzle which becomes high temperature especially among radial turbine components is cooled, and substantially all cooling air used for this cooling contributes to mechanical work for driving a turbine impeller.

Other objects and features of the present invention will become apparent from the following description of the embodiments.

BRIEF DESCRIPTION OF THE DRAWINGS

FIG. 1(A) is a front sectional view, and FIG. 1(B) is a side sectional view;

BEST MODE FOR CARRYING OUT THE INVENTION

An embodiment of the present invention will now be described in detail with reference to the drawings.

Figure 1:
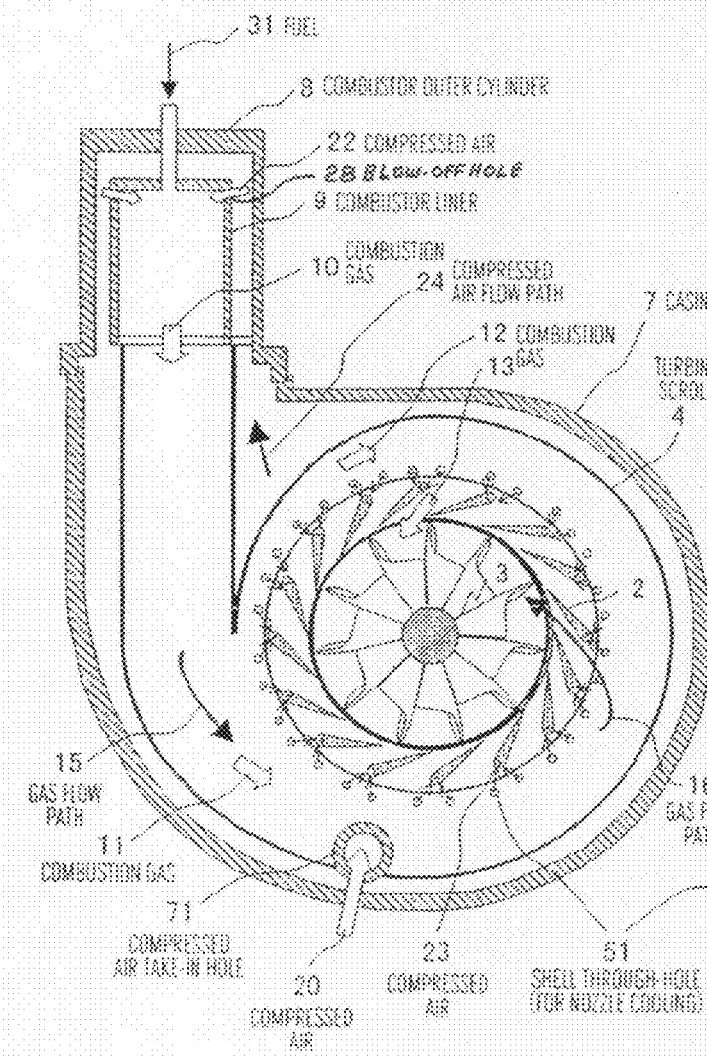
FIG. 1 shows cooling structure of a turbine part of a radial turbine power generating equipment according to a first embodiment of the present invention, in particular.
Figure 1:
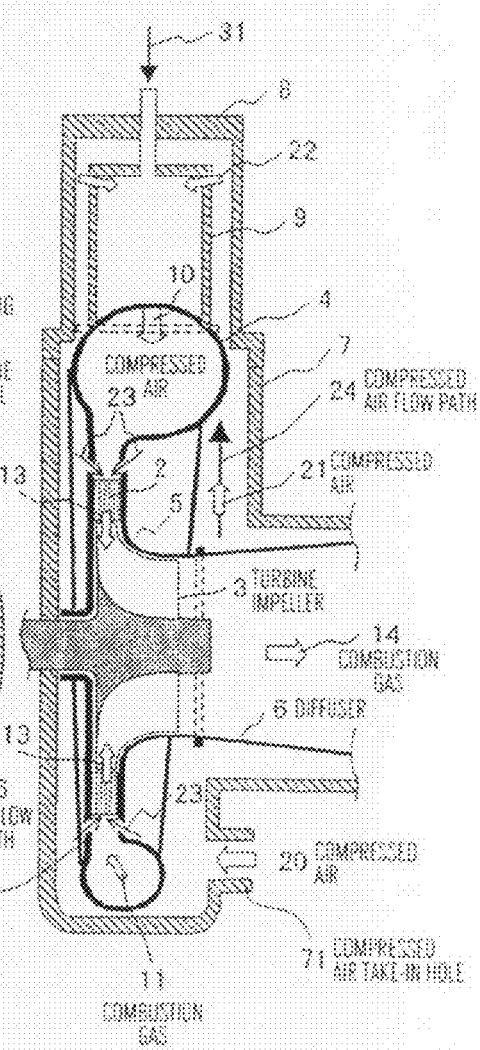

FIG. 1 shows structure of a radial turbine according to a first embodiment of the present invention. In the radial turbine, combustion gases 10 to 14 pass through a turbine nozzle 2 from an outer side to an inner side in a radius direction especially in a region shown by reference numeral 13 and are injected to a turbine impeller 3 of a rotor. This rotates the turbine impeller 3, and the combustion gas 14 is configured to flow out in a rotary shaft direction.

In this embodiment, the double casing structure is adopted for a turbine. First, combustion gas flow paths 15 and 16 of the turbine in which the combustion gases 10 to 14 pass are formed by being covered with a turbine scroll 4, a turbine shell 5 and a diffuser 6.

Next, the outer sides of the turbine scroll 4, the turbine shell 5 and the diffuser 6 are covered with a turbine casing 7 while leaving a space therebetween. The casing 7 connects with a combustor outer cylinder 8 to form a compressed air flow path 24 in which air-tightness is kept with respect to the outside air. Compressed air 20 is taken into compressed air flow path 24 from a compressed air take-in hole 71 of the casing 7. The compressed air 20 becomes compressed air 21 which flows in the compressed air flow path 24 between the turbine shell 5 and the turbine casing 7 forming a double casing, and most of the air becomes compressed air 22 injected into a combustor liner 9 through a blow-off hole 28.

In the combustor liner 9, a high temperature/high pressure combustion gas 10 is injected into the turbine scroll 4 by combustion reaction of a fuel 31 and the compressed air 22. The combustion gas 10 passes through the combustion gas flow paths 15 and 16, and becomes the combustion gases 11, 12 and 13, which are then injected toward the radial turbine impeller 3 to rotate it.

Here, in a position just before the turbine nozzle 2 in the combustion gas flow path 16, the turbine shell 5 is provided with a number of shell through-holes 51 for cooling the nozzles. Therefore, a part of the compressed air 21 becomes compressed air 23 and is injected to a front edge of the nozzle 2 in the combustion gas flow path 16 from these through-holes 51. The nozzle cooling compressed air 23 is at lower temperature than the combustion gas 13, and thus effectively cools the nozzle 2.

Next, the operation of this embodiment will be described in detail.

In this case, the operating gas described as compressed air 20 may be another gas as long as it is a gas which has predetermined pressure and causes combustion reaction with the fuel in the combustor liner 9. The compressed air 20 is pressurized by a compressor or the like, and is raised in temperature in a regenerator in some instances and is taken into the compressed air flow path 24 in the turbine casing 7. Its mass flow rate is set as $G_0$, pressure as $P_0$ and temperature as $T_0$. The compressed air 20 becomes the compressed air 21, and is guided to the combustor outer cylinder 8 by the compressed air flow path 24 passing an outer periphery of the turbine shell 5. On the way thereof, a part of the compressed air 21 passes through the through-holes 51 provided in the turbine shell 5, and branch into the inside of the turbine shell 5 as the nozzle cooling compressed air 23. The mass flow rate of the branched cooling compressed air 23 is set as $\Delta G$, the pressure thereof as $P_0$ and the temperature thereof as $T_0$. Since the combustor is of a return flow type, the compressed air 22 after the cooling compressed air 23 is branched is guided to the combustor outer cylinder 8, and flows into the combustor liner 9 from the combustor outer cylinder 8. As for the compressed air 22 which flows into the combustor liner 9, the mass flow rate is $G_0-\Delta G$, the pressure is $P_1$, and the temperature is $T_0$. In the combustor liner 9, the fuel 31 of the mass flow rate $\alpha$ and the above described compressed air 22 are mixed and combusted to be the combustion gas 10 at a high temperature (mass flow rate: $G_0-\Delta G+\alpha$, pressure: $P_1$, temperature: $T_1$), and the combustion gas 10 is injected to the turbine scroll 4 from the combustor liner 9. Here, $P_0>P_1$, and the pressure difference $P_0-P_1$ is due to pressure loss by the compressed air flow path 24 inside the turbine casing 7 up to the combustor liner 9.

The injected combustion gas 10 becomes the combustion gases 11 and 12 which pass through the turbine scroll 4, and thereafter, reach a turbine nozzle circular blade cascade 2.

At the inlet of the turbine nozzle circular blade cascade 2, high temperature combustion gases 11 and 12 (mass flow rate: $G_0-\Delta G+\alpha$, pressure: $P_1$, temperature: $T_1$) merges with the cooling compressed air 23 (mass flow rate: $\Delta G$, pressure: $P_0$, temperature: $T_0$) which has flown in through the cooling through-holes 51 of the turbine shell 5 from the compressed air flow path 24. Therefore, the combustion gas 13 which is injected to the radial turbine impeller 3 from the inlet of the turbine nozzle circular blade cascade 2 is the combination of the combustion gas 10 and the compressed air 23.

Further, as shown in FIG. 1(B), the cooling thorough-hole 51 is provided at a position in the vicinity of the front edge portion of the turbine nozzle circular cascade 2, with a tilt angle in the direction of the flow of the combustion gas. Accordingly, by directly injecting the compression air 23 of relatively low temperature to the nozzle blade 2 of high temperature, the nozzle blade 2 can be effectively cooled, while temperature reduction $\Delta T$ of the entire combustion gas 13 can be made small, and reduction in turbine efficiency can be suppressed.

According to this embodiment, the mass flow rate flowing into the turbine nozzle circular blade cascade 2 becomes $G_0-\Delta G+\alpha+\Delta G=G_0+\alpha$, and all flow rate taken in from the compressed air take-in hole 71 can be caused to contribute to rotation of the turbine impeller 3. Accordingly, in the compressed air 20 of the mass flow rate $G_0$ which has been taken in, the flow rate which does not contribute to mechanical work for driving the radial turbine impeller 3 does not exist, and thus, the energy efficiency can be enhanced. The cooling shell through-holes 51 are provided in both walls of the turbine shell 5 which sandwich the flow path of the combustion gas 13, and the nozzle blade 2 is cooled from both sides, whereby imbalance of the temperature distribution in the flow path direction of the nozzle blade 2 hardly occurs, and thermal distortion can be suppressed.

The high temperature gas 13 after cooling the turbine (mass flow rate $G_0+\alpha$, pressure $P_1$, temperature $T_1-\Delta T$) is expanded and accelerated by the turbine nozzle circular blade cascade 2, gives energy to the radial turbine impeller 3 to drive it, and flows out in the rotary shaft direction as a combustion gas 14. Here, when the rotary shaft of the radial turbine impeller 3 is connected to generator, the shaft drive force of the radial turbine impeller 3 is directly connected to generated output.

The gas 14 which has flown out in the rotary shaft direction from the radial turbine impeller 3 is decelerated by the diffuser 6 to restore its pressure and is guided to an exhaust silencer, the regenerator and the like.

In an ordinary radial turbine, when the combustion gas 10 having been injected from the combustor liner 9 is subjected to adiabatic expansion in the turbine, the metal temperature of the turbine shell 5 and the diffuser 6 becomes high. However, in this embodiment, the compressed air flow path 24 is formed so that the shell 5 and the diffuser 6 are covered with the casing 7, whereby the shell 5 and the diffuser 6 are wrapped with the atmosphere of the compressed air 21 of lower temperature and can be effectively cooled.

Comparing this embodiment with the above described prior art, the mass flow rate of the high temperature gas 13 after cooling the turbine which will directly act on the mechanical work for driving the radial turbine impeller 3 can be increased by the mass flow rate $\Delta G$ of the compressed air 23 for cooling the nozzle. In other words, substantially all mass flow rate $G_0$ of the compressed air 20 taken into the turbine is caused to be involved in the mechanical work for driving the radial turbine impeller 3 after cooling the nozzle, and thereby, efficiency of the turbine can be enhanced.

Figure 2:
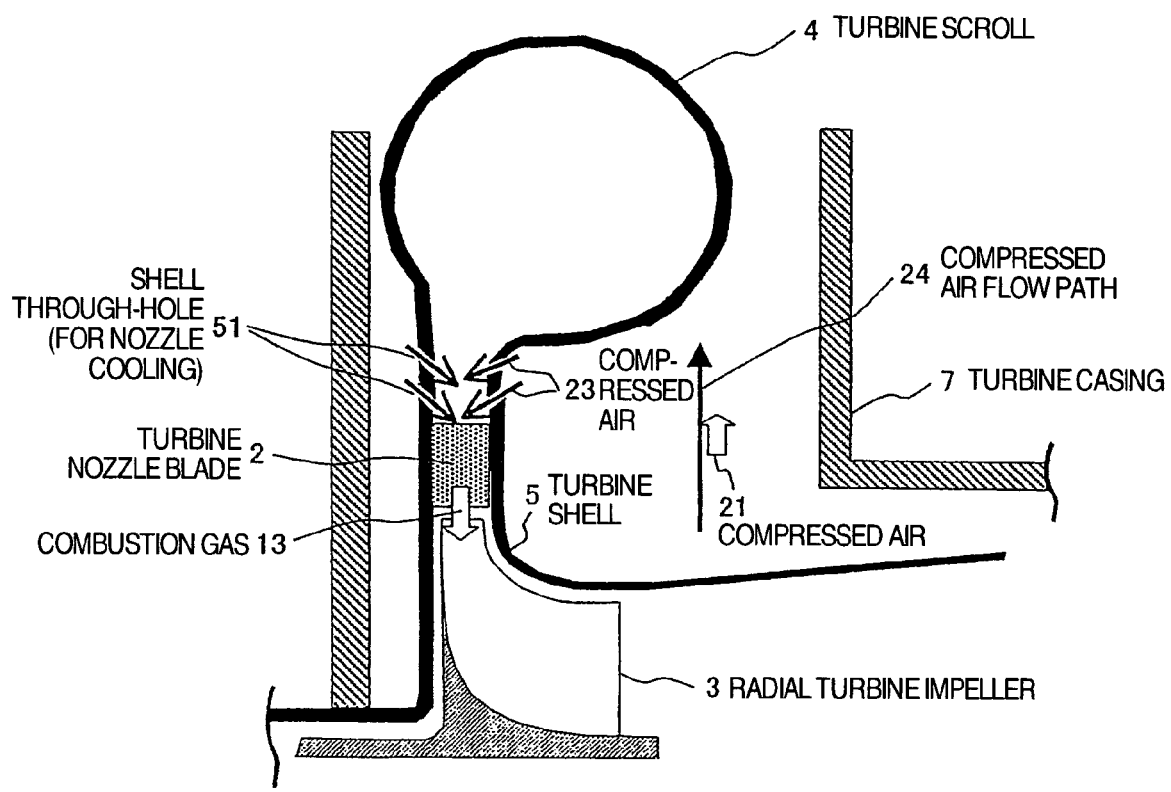
FIG. 2 is a side sectional view showing a main part of the cooling structure according to a second embodiment of the present invention.

FIG. 2 is a side sectional view showing a main part of the cooling structure according to a second embodiment of the present invention. The different point of FIG. 2 from FIG. 1 is the disposition of the shell through-holes, but the others are the same as those in FIG. 1. Thus, illustration in the drawing and explanation thereof will be omitted.

A plurality of through-holes 51 are disposed in both walls of the turbine shell 5 spaced from each other in the direction of the flow of the combustion gas 13 to reinforce cooling in the front edge portion of the nozzle blade 2.

Figure 3:
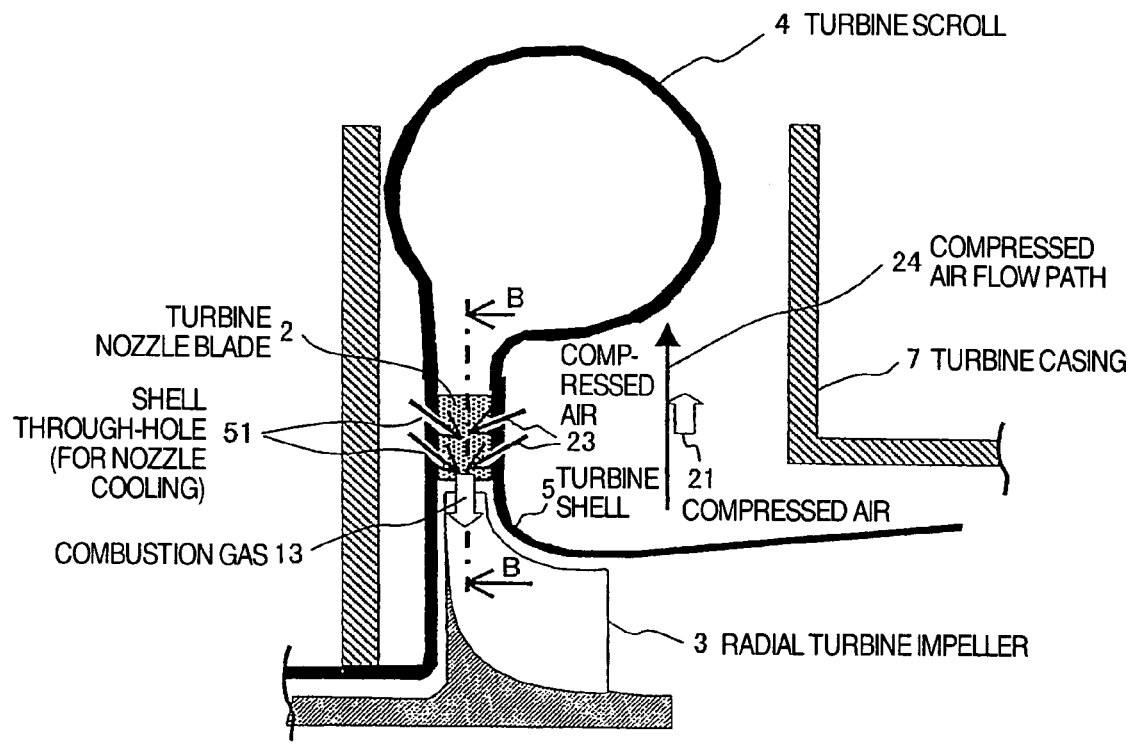
FIG. 3 is a side sectional view showing a main part of the cooling structure according to a third embodiment of the present invention.
Figure 3:
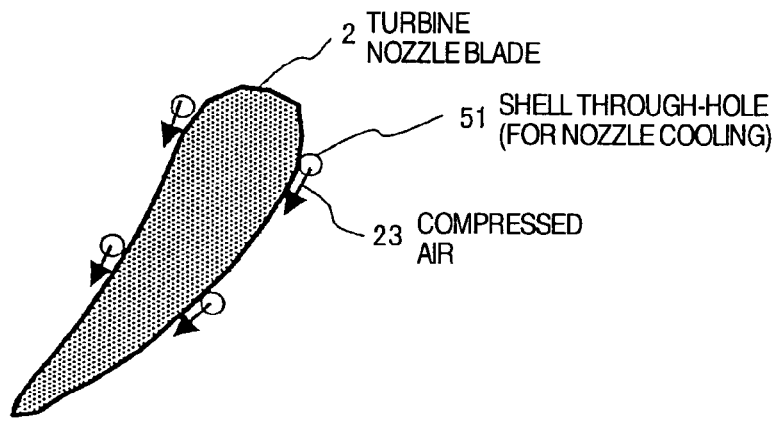

FIG. 3 is a side sectional view showing a main part of the cooling structure according to a third embodiment of the present invention. In FIG. 3, the different point of FIG. 3 from FIG. 1 is the disposition of the shell through-holes, but the others are the same as those in FIG. 1. Thus, illustration in the drawing and explanation thereof will be omitted.

In this embodiment, for the purpose of film-cooling the entire outer periphery of the nozzle blade 2 of the turbine nozzle circular blade cascade, a plurality of cooling shell through-holes 51 are provided at a portion where both wall surfaces of the shell 5 forming the combustion gas flow path and the outer periphery of the nozzle blade 2 are in contact with one another as shown in the drawing. These shell through-holes 51 are tilted toward the downstream side of the flow path of the combustion gas 13 to decrease the resistance to the combustion gas 13.

Figure 4:
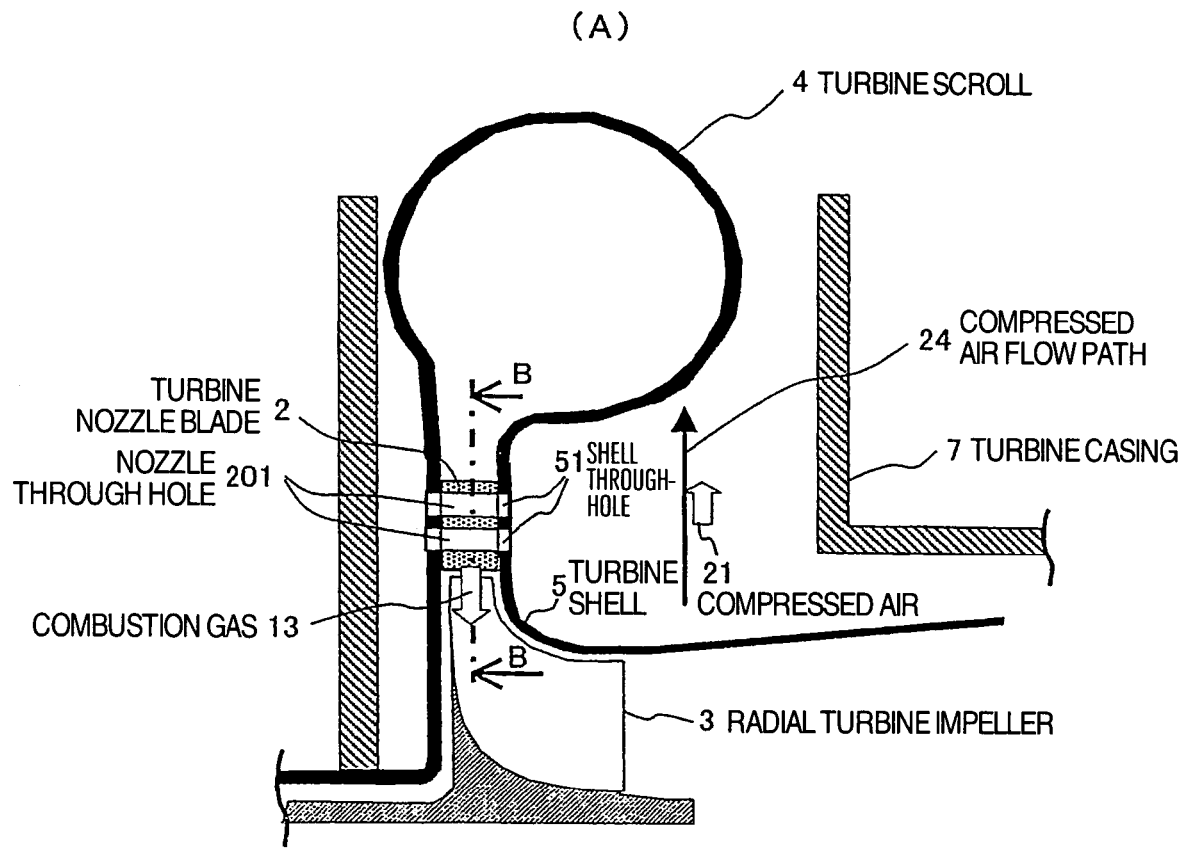
FIG. 4 is a side sectional view showing a main part of the cooling structure according to a fourth embodiment of the present invention.
Figure 4:
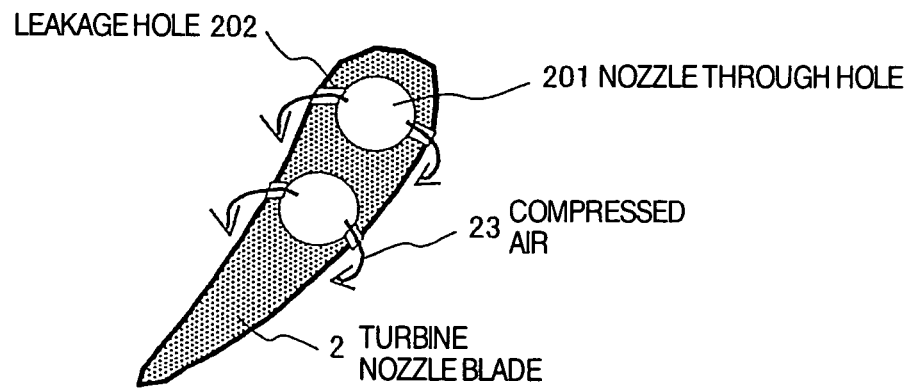

FIG. 4 is a side sectional view showing a main part of the cooling structure according to a fourth embodiment of the present invention. In FIG. 4, the different point of FIG. 4 from FIG. 1 is the disposition of the shell through-holes, but the others are the same as those in FIG. 1. Thus, illustration in the drawing and explanation thereof will be omitted.

In this embodiment, one or more through-holes 201 are provided inside the nozzle blade 2, and are penetrated from one side of the compressed air flow path 24 which interposes the flow path of the combustion gas 13 to the other side of the compressed air flow path 24 via the shell through-holes 51 in the wall surface of the shell 5, the nozzle thorough holes 201 of the blade thick portion of the nozzle, and the shell through-holes 51 in the wall surface of the shell 5 on the other side. A leakage hole 202 which leads to the surface of the nozzle 2 from the blade thick portion of the nozzle 2 of the nozzle thorough-hole 201 is further provided. The structure in which the compressed air is guided to the outer peripheral wall of the nozzle blade 2 through the leakage hole 202 from the thorough-holes 51 and 201, and cooling of the nozzle blade 2 is promoted from its inside and outside is thereby provided.

Further, as another embodiment of the cooling structure of the nozzle of the radial turbine according to the present invention, the combination of any of FIGS. 1, 2, 3 and 4 can be adopted. In any combination, substantially all mass flow rate of the compressed air 20 taken into the turbine contributes to the mechanical work for rotating the turbine impeller 3 after cooling the nozzle, so that the energy efficiency of the turbine can be enhanced.

INDUSTRIAL APPLICABILITY

As described in the item of Background Art, a gas turbine power generating equipment of several tens to several hundreds kW using a radial turbine as a gas turbine which drives a generator is recently under consideration. The present invention proposes the structure which enhances the energy efficiency and is effective to enhance the power generation efficiency and relatively simple, which is expected to be put into practice.

The invention claimed is;

1. A radial turbine comprising:
a casing which covers all of a scroll, a shell and a diffuser while leaving a space therebetween. the diffuser connecting with the shell, the scroll being mounted inside the casing to form a first part of a combustion gas flow path for guiding a combustion gas generated in a combustor to a nozzle which injects the combustion gas to a radial impeller on an inner side in a radial direction of a rotary shaft, the shell covering the nozzle and the impeller and forming a second part of the combustion gas flow path;
an airtight air flow path formed in said space in a substantially airtight state;
an air take-in hole formed in the casing, which takes in air into the air flow path from the outside of the casing;
a combustor outer cylinder mounted to the casing;
a combustor liner mounted inside the combustor outer cylinder, which is communicated with the scroll and guides the combustion gas into the scroll;
a blow-off hole which guides a first part of the air taken into the airtight air flow path, into the combustor liner; and
through holes extending through the shell from the airtight air flow path on both sides of the nozzle adjacent a front edge of the nozzle and inclined at an angle toward a direction of flow of the combustion gas to inject a second part of the air taken into the airtight air flow path into the combustion gas passing through the nozzle, wherein
the nozzle includes a circular blade cascade in which a number of blades are arranged in a row in a circumference thereof and of which a center is a turbine rotary shaft, and the through holes extending through the shell include a plurality of through holes along a surface of each blade of the circular blade cascade.

2. The radial turbine according to claim 1, characterized in that the air flow path is formed to cover an outer side of the combustion gas flow path communicating from the combustor to the shell.

3. The radial turbine according to claim 1 characterized in that the air flow path is formed to cover an outer side of the combustion gas flow path communicating from the combustor to the shell, and the through-holes are formed in walls of the shell at a portion upstream of the nozzle.

4. The radial turbine according to claim 1, characterized in that a plurality of the through-holes are arranged in parallel along a direction of flow of the combustion gas flow path.

5. The radial turbine according to claim 1, characterized by further comprising: a through-hole which leads from one side of the air flow path sandwiching the combustion gas flow path to the other side of the air flow path while penetrating a wall of the shell, a blade thick portion of the nozzle and a wall of the shell on the other side; and a leakage hole which leads from the blade thick portion of the nozzle of the through-hole to a surface of the nozzle.

6. A radial turbine comprising:
a casing which covers all of a scroll, a shell and a diffuser while leaving a space therebetween, the diffuser being connected to the shell, the scroll forming a first part of a combustion gas flow path for supplying the combustion gas generated in the combustor liner to a turbine nozzle which accelerates the combustion gas toward an inner side in a radial direction of a rotary shaft and supplies the combustion gas to a radial turbine impeller and the shell covering the turbine nozzle and the radial turbine impeller;
a combustor liner in which compressed air and a fuel are mixed and combusted to generate a combustion gas;
an airtight air flow path formed in the space;
an air take-in hole which takes air into the air flow path from the outside of the casing;
a combustor outer cylinder mounted to the casing, said combustor liner being mounted inside the combustor outer cylinder and being communicated with the scroll to guide the combustion gas into the scroll;
a blow-off hole which guides a first part of the airtight air taken into the air flow path, into the combustor liner; and
through holes extending through the shell from the airtight air flow path on both sides of the nozzle adjacent a front edge of the nozzle and inclined at an angle toward a direction of flow of the combustion gas to inject a second part of the airtight air taken into the air flow path into the combustion gas passing through the nozzle, wherein
the nozzle includes a circular blade cascade in which a number of blades are arranged in a row in a circumference thereof and of which a center is a turbine rotary shaft, and the through holes extending through the shell include a plurality of through holes along a surface of each blade of the circular blade cascade.

7. The radial turbine according to claim 6, characterized in that the air flow path is formed by the casing so as to cover an outer side of the combustion gas flow path communicating from the combustor to the shell.

8. The radial turbine according to claim 6, characterized in that the air flow path is formed to cover an outer side of the combustion gas flow path communicating from the combustor to the shell, and the through-holes are formed in the walls of the shell at a portion upstream of the nozzle.

9. The radial turbine according to claim 6, characterized in that a plurality of the through-holes are arranged in parallel along direction of flow of the combustion gas flow path.

10. The radial turbine according to claim 6, characterized by further comprising: a through-hole which leads from one side of the air flow path sandwiching the combustion gas flow path to the other side of the air flow path while penetrating a wall of the shell, a blade thick portion of the nozzle and a wall of the shell on the other side; and a leakage hole which leads from the blade thick portion of the nozzle of the through-hole to a surface of the nozzle.

* * * * *